(12) United States Patent
Müller et al.

(10) Patent No.: US 6,208,239 B1
(45) Date of Patent: Mar. 27, 2001

(54) PROCEDURE FOR THE PROVISION OF ACCESS AUTHORIZATION TO AN ENGINE-DRIVEN VEHICLE

(75) Inventors: Karl-Heinz Müller; Walter Ulke, both of Friedrichshafen; Wolfgang Voss, Immenstaad; Udo Knepper, Langenargen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/415,226

(22) Filed: Oct. 12, 1999

(30) Foreign Application Priority Data

Oct. 10, 1998 (DE) .............................. 198 46 803

(51) Int. Cl.$^7$ ....................................... B60R 25/10
(52) U.S. Cl. .............. 340/426; 340/825.54; 340/825.72; 340/825.69; 340/429; 340/435; 340/438
(58) Field of Search ................. 340/426, 425.5, 340/825.31, 825.32, 825.34, 825.45, 825.69, 825.71, 825.72

(56) References Cited

U.S. PATENT DOCUMENTS 5,528,086 * 6/1996 Maass et al. ................... 340/426
5,596,317 * 1/1997 Brinkmeyer et al. ........... 340/825.31
5,808,372 * 9/1998 Schwegler et al. ............. 307/10.3

FOREIGN PATENT DOCUMENTS 44 09 167 C1   6/1995 (DE) .
WO 99/02377    1/1999 (WO) .

* cited by examiner

Primary Examiner—Jeffery A. Hofsass
Assistant Examiner—Hung Nguyen
(74) Attorney, Agent, or Firm—Venable; Norman N. Kunitz

(57) ABSTRACT

In a procedure for the provision of access authorization for an engine-driven vehicle, if there is an operator request for the provision of access authorization to an engine-driven vehicle, a bidirectional signal transmission using encoded transmission signals and an electronic key will be effected. From transmission units located on or in the vehicle, vehicle signals will be transmitted to the electronic key, and, from the electronic key, key signals will be returned as echo signals to the respective transmission units. The time difference between the vehicle signal and the key signals will be determined and evaluated. The position of the electronic key in relation to the vehicle will be determined by means of successive bidirectional signal transmissions between at least two transmission units and the electronic key as well as by evaluating the time differences; having determined the actual key position, a decision on access authorization to the vehicle will be made.

13 Claims, 2 Drawing Sheets

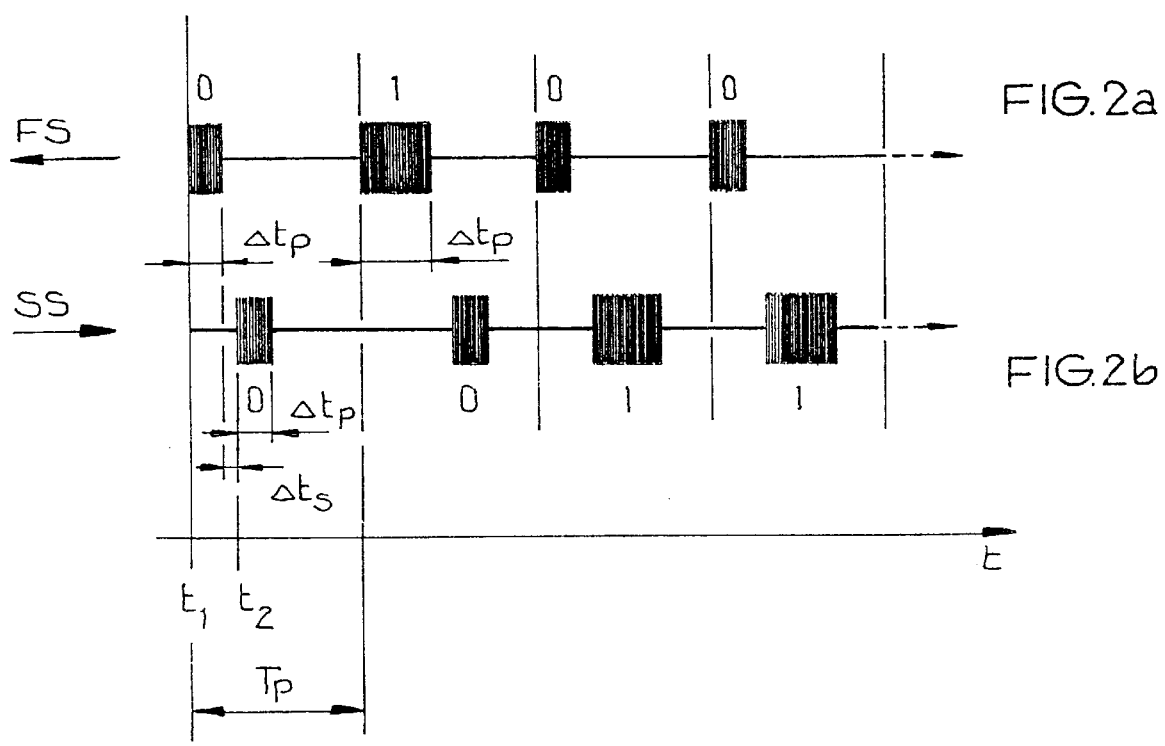

PROCEDURE FOR THE PROVISION OF ACCESS AUTHORIZATION TO AN ENGINE-DRIVEN VEHICLE

BACKGROUND OF THE INVENTION

With engine-driven vehicles, access authorization to the vehicle is subdivided into two separate processes: actual access to the vehicle on the one hand (closing/opening the vehicle by closing/opening the vehicle doors), and starting the vehicle on the other hand (the start process for the vehicle engine, initiated by operating the ignition lock).

Normally, access authorization to the vehicle is provided by mechanical means, that is, by means of a conventional car key. However, increasingly access authorization is also provided by electronic processes and techniques; in such cases, encoded signals will be transmitted between an electronic key and at least one transmission unit located in or on the vehicle (in particular, on the periphery of the vehicle). Thus, for example, encoded signals will be transmitted between an electronic key and a door lock for unlocking the door lock, and/or between a remote control unit and a drive control unit and/or an anti-theft device (a vehicle immobilizer) to release the drive control unit; following evaluation and verification of the signals, as well as meeting specific conditions if necessary, authorized access to the vehicle will be provided.

For these two separate access authorization processes—access to the vehicle on the one hand, and starting the vehicle on the other hand—different operator activities are usually required, as well as different conditions to be met: thus, for example, a vehicle may be started up only if the electronic key is located inside the vehicle; also, for safety reasons, it should only be possible to lock the vehicle doors if the electronic key is located outside the vehicle. Therefore, the two access authorization processes must be differentiated; to this end, the position of the electronic key needs to be determined—in particular, it must be possible to identify its position relative to the vehicle interior and exterior ("interior detection").

OBJECT OF THE INVENTION

The invention is based on the task to state a procedure for providing access authorization to an engine-driven vehicle in accordance with the preamble of patent claim 1 wherein a reliable access authorization is provided in a simple fashion for authorized operators. In accordance with the invention, this task is solved by the features described in the characterizing clause of patent claim 1.

Advantageous embodiments of the invention result from further patent claims.

SUMMARY OF THE INVENTION

With the process described here, if there is an operator request for the provision of access authorization to an engine-driven vehicle—that is, either for providing access to the vehicle by carrying out a locking or opening operation on the vehicle doors, or for providing vehicle startup by carrying out an engine start process,—a bidirectional signal transmission (bidirectional communication) between at least two (preferably, however, at least three) transmission units permanently mounted in or on the vehicle and the electronic key carried by the operator will be performed, during which transmission at least the signal run time for the bidirectionally transmitted signals between the respective transmission unit and the electronic key will be determined. The distance between the transmission units and the electronic key is obtained by evaluating this signal run time value, that is by determining the time difference between the vehicle signal, in particular the activation signal transmitted as a first vehicle signal at the start of the signal transmission (communication), transmitted by the respective transmission unit to the electronic key, and the key signal (echo signal) returned from the electronic key and received by the respective transmission unit; the evaluation of this signal run time measurement may be effected e.g. by means of a control unit connected with the transmission units. In order to suppress undesirable echo effects in the key signal (that is, in order to distinguish the desired echo signal from undesirable echo signals) it is possible to use various different methods: for example, the key signal returned from the electronic key to the respective transmission unit may be emitted only on expiry of a specific predefined delay time following reception of the vehicle signal, which delay time needs to be taken into appropriate account when measuring signal run time and determining the distance; or the desired echo signal can be characteristically "colored" (e.g. by a frequency offset between the frequency of the vehicle signal and the frequency of the key signal). As successive signal run time measurements are carried out between at least two (preferably at least three) transmission units, located in different positions on the vehicle, and the electronic key, the position of the latter may be determined by comparing and evaluating the signal run times of the key signals being received by the various different transmission units. In particular, limit values for the signal run time can be specified, e.g. for the maximum permissible signal run time (by specifying a maximum limit) and/or for reliable signal run time ranges (by specifying maximum and minimum limits) which will define the maximum permissible distance and/or reliable distance ranges for signal transmission (communication) between the electronic key and the transmission units or the vehicle; that is, the execution of the operator request (release of the process requested by the latter for the provision of access authorization) will be carried out only if there exists a specified distance range. On the one hand, this allows the permissible signal transmission distance to be limited (and, in consequence, the permissible distance of the operator from the vehicle for executing the operator request or for the provision of access authorization), and, on the other hand, this also allows a differentiation between the vehicle interior and the vehicle exterior (interior detection). In particular, different limit values for the signal run time and thus different permissible distance ranges may be specified for access to the vehicle and for vehicle startup, allowing simple adaptation to different vehicles and/or different vehicle types.

In connection with the signal transmission, and for determining the position of the electronic key, it is additionally possible to carry out also a (bidirectional) data transmission between the electronic key and the transmission units, e.g. for transmitting cryptological data (e.g. by means of challenge and response protocols) and/or data required for localisation (e.g. for identifying the respective transmission unit or for a transmission unit ID). Using these transmitted data, a verification of the electronic key can be effected, that is, the right of the operator for effecting access authorization can be checked.

The bidirectional signal transmission between the transmission units and the electronic key can be effected either by means of impulses or by means of continuous signals (cw process) using a suitable modulation, and by means of a suitable transmission principle (e.g. HF, IR, or ultrasound)

preferably within the microwave range. The transmission signals from the transmission units and the electronic key, that is, the vehicle signal and the key signal can be emitted at the same transmission frequency (carrier frequency) or at different transmission frequencies, e.g. within the HF range in an ISM band having a transmission frequency of e.g. 2.4 GHz or 5.8 GHz. Here, for signal transmission, a high bandwidth of the transmission signals—necessary for high resolution time measurement—needs to be implemented (e.g. >10 MHz) in order to enable the required distance resolution for localizing the current position of the electronic key (of the authorized operator). The bidirectional signal transmission between the transmission units and the electronic key is effected at a high transmission rate, e.g. at a transmission rate in excess of 100 kBaud. In the case of an impulse type signal transmission, a suitable impulse modulation process can be used; the data information can be encoded e.g. in the impulse duration of the impulses transmitted or in the length of impulse packets (number of impulses).

The transmission units are mounted in or on the vehicle in such distribution that the current position of the electronic key can be determined in a positively and sufficiently exact manner. In particular, this can be achieved by a specific minimum number of transmission units and by an approximately equidistant distribution in space of such transmission units. The electronic key to be carried by the operator, which key serves to identify the operator, or as proof of authorization (ID transmitter), may take any form such as for example the form of a cheque card, or the form of a key complete with key bit, or the form of a key without key bit.

The transmission units will be activated either only whenever there is an operator request for the provision of access authorization to the vehicle, or on a continuous basis, that is, they transmit an activation signal as a first vehicle signal either only whenever there is an operator activity, or cyclically at specified time intervals. This operator activity as a triggering factor for the start of the bidirectional signal transmission (communication) between the transmission units and the electronic key is different for the two forms of access authorization: for access to the vehicle, this is e.g. operating a door handle (e.g. the door handles of the driver door, passenger door, or tailgate); for vehicle startup, this is e.g. operating the start switch. The signal transmission of the key signal from the electronic key (carried by the operator) to the transmission units will in any case be initiated only by receiving a signal from a transmission unit.

In addition, even with the engine running, a monitoring of the electronic key position may still be effected, in particular whilst the vehicle is moving; for example, it is possible to issue a warning signal (alarm signal) if the electronic key is removed from the vehicle interior whilst the engine is still running.

In the case of the process described here, the provision of access authorization to an engine-driven vehicle can be effected by simple means, and, advantageously, it features a high degree of security as the short signal transmission times and the precise and reproducible specification of permissible distance ranges for signal transmission (in particular, with regard to maximum reach) any manipulations can be effectively prevented. Furthermore, it is possible by simple means to determine the position of the electronic key, and also to distinguish positively between the vehicle interior and the vehicle exterior (interior detection).

BRIEF DESCRIPTION OF THE DRAWINGS

FIG. 2a shows the vehicle signal emitted by the transmission unit, and FIG. 2b shows the key signal detected by the transmission unit.

DESCRIPTION OF A PREFERRED EMBODIMENT

Figure 1A:
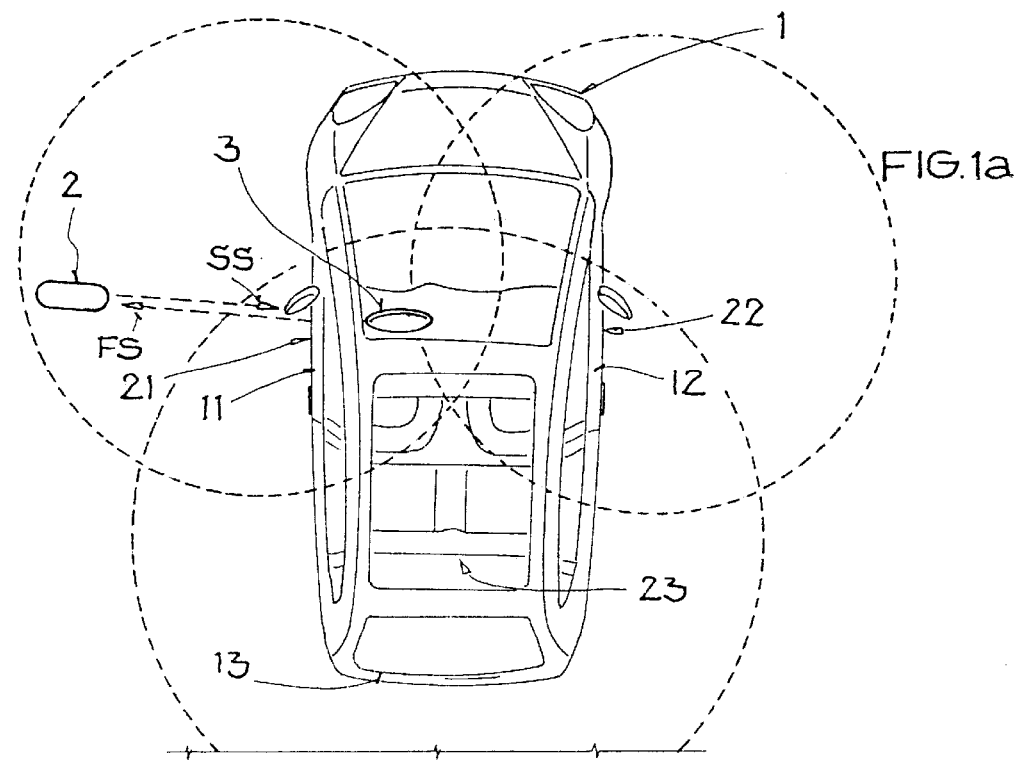
FIG. 1 schematic structure of a motor vehicle complete with the permissible distance ranges for the signal transmission in respect of both processes for providing access authorization, that is, for access to the vehicle (FIG. 1a) and for vehicle startup (FIG. 1b), FIG. 2 temporal course of the bidirectional signal transmission between the transmission units and the electronic key in the case of an impulse type signal transmission with digital impulse duration modulation, where

In accordance with FIG. 1, three transmission units 21, 22, 23 have been allocated to vehicle 1; the first transmission unit 21 is located in a trim strip on the driver side of the vehicle, the second transmission unit 22 is located in a trim strip on the passenger side, and the third transmission unit 23 is located in the third brake light or in the rear parcel shelf. The transmission units 21, 22, 23 transmit cyclically and at periodic intervals activation signals as vehicle signals FS; the electronic key 2, taking the form of a key without key bit (for example), is carried by the operator (authorized user) and serves as proof of identity in the event of an operator request for providing access authorization to vehicle 1, that is, this key is used to check the authorization of the operator for access to vehicle 1 as well as for starting vehicle 1 (in respect of the engine startup process). The bidirectional signal transmission (communication) that is, the signal transmission of the key signal SS from the electronic key 2 to the transmission units 21, 22, 23 will be initiated by an operator activity: when accessing vehicle I by operating a door handle (of driver door 11, passenger door 12, or tailgate 13), when starting vehicle 1 by operating the start switch 3 located e.g. in the dashboard. Only in cases where the signal run time between the transmission units 21, 22, 23 and the electronic key 2 lies within a specified time range, that is, the distance between the respective transmission unit 21, 22, 23 and the electronic key 2 lies within a specified distance range corresponding to the signal run time, there will be an evaluation of the key signal SS detected by the respective transmission unit 21, 22, 23, and thus a verification of the data transmitted between the respective transmission unit 21, 22, 23 and the electronic key 2.

Figure 1B:
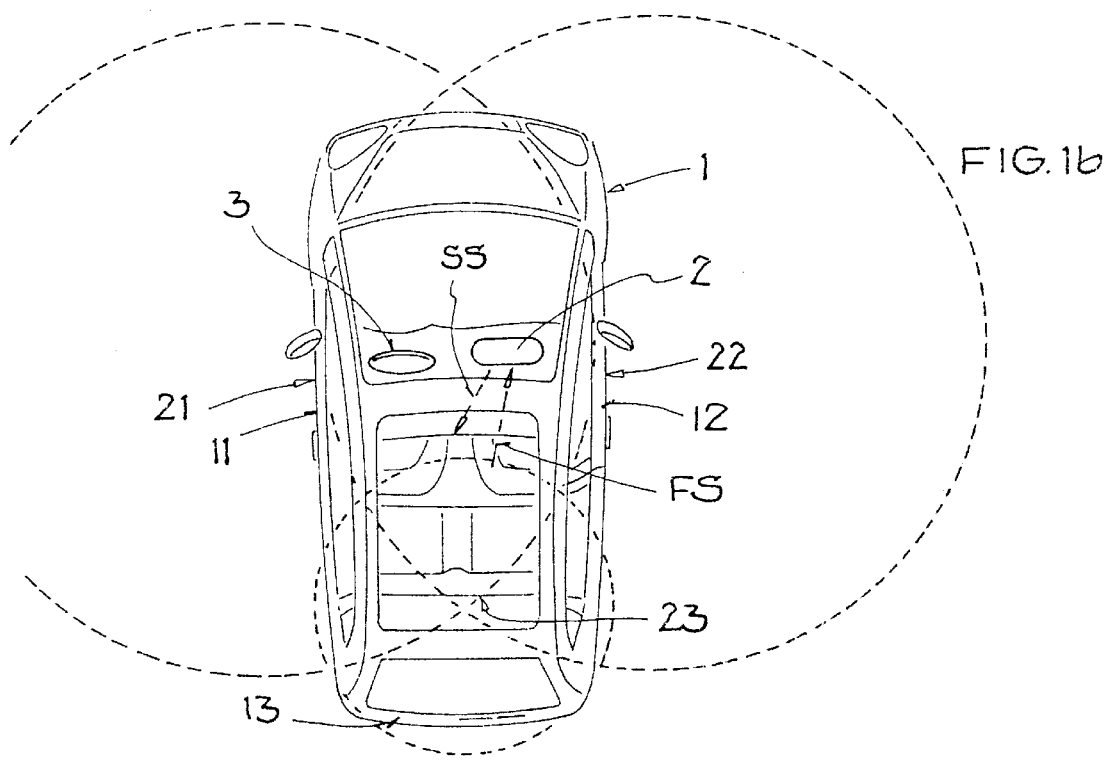

As a comparison of FIGS. 1a and 1b shows, different ranges for the permissible signal run time between the transmission units 21, 22, 23 and the electronic key 2 are defined for the two processes with regard to the provision of access authorization for vehicle 1, and thus different permissible distance ranges for the distance between the transmission units 21, 22, 23 and the electronic key 2 are also defined:

In accordance with FIG. 1a, in the case of an operator request for providing access to vehicle 1 (opening the vehicle doors 11, 12, 13)—depending on the vehicle door 11, 12, 13 to be operated—a key signal SS from different transmission units 21, 22, 23 must be detected within the permissible time range: if driver door 11 is operated by the first transmission unit 21 or the third transmission unit 23, or if passenger door 12 is operated by the second transmission unit 22 or the third transmission unit 23, and if tailgate 13 is operated by the third transmission unit 23 only. In order to prevent any unauthorized opening of vehicle 1, in the event of the transmission signals having an overreach distance, the maximum permissible distance for communication between the electronic key 2 and the transmission units 21, 22, 23 of the vehicle will be limited to 3 m (for example).

In accordance with FIG. 1b, in the case of an operator request for starting up the vehicle 1, a key signal SS from the first transmission unit 21 and the second transmission unit 22, or from the first transmission unit 21 and the third transmission unit 23, or from the second transmission unit 22 and the third transmission unit 23, or from the first transmission unit 21 and the second transmission unit 22 and the third transmission unit 23 must be detected within the permissible time range (as a measure for the permissible distance); this means that the electronic key 2 is located within the vehicle 1, and thus any unauthorized startup of the vehicle engine by operating the start switch 3 can be prevented, if the electronic key 2 is not located in the vehicle 1.

FIG. 2 shows the temporal sequence of the vehicle signals FS (FIG. 2a), transmitted by a transmission unit 21, 22, 23 of the vehicle 1, and the key signals SS (FIG. 2b) received by a transmission unit 21, 22, 23 of the vehicle 1. The impulse type bidirectional signal transmission between the transmission units 21, 22, 23 and the electronic key 2 comprises e.g. a measurement of the actual signal run time as well as a data transmission of cryptologic data.

According to FIG. 2a, one of the transmission units 21, 22, 23 at time $t_1$ will emit an activation signal, following an operator activity, as a first vehicle signal FS; and hereby the electronic key 2 will be activated (impulse length $\Delta t_p$ for ex. 20 ns, carrier frequency of the vehicle signal FS for ex. 5.8 GHz, bandwidth>10 MHz, flank steepness 10 ns). According to FIG. 2b, the electronic key 2 will return a key signal SS as an echo signal to this transmission unit 21, 22, 23 (impulse length $\Delta t_p$ for ex. 20 ns, carrier frequency of the key signal SS for ex. 5.8 GHz)—either immediately following activation or on expiring of a predefined delay period (e.g. 100 ns)—, which echo signal will be detected at time $t_2$ by the respective transmission unit 21, 22, 23 (see FIG. 2b). The signal run time $\Delta t_s$ will be determined, taking into account the delay period, and from this value the distance between the respective transmission unit 21, 22, 23 and the electronic key 2 will be calculated. This bidirectional signal transmission between the transmission unit 21, 22, 23 and the electronic key 2, and the determination of the signal run time $\Delta t_s$, will be carried out successively between all three transmission units 21, 22, 23 and the electronic key 2; from this, the position of the electronic key 2 in relation to the vehicle 1 can be identified. At the same time a data transmission between the transmission units 21, 22, 23 and the electronic key 2 will take place in order to exchange cryptologic protocols (challenge and response protocols), with the temporal spacing $T_p$ between the individual impulses—that is, period duration for a signal transmission,—amounting to e.g. 10 µs (data transmission rate for ex. 100 kBaud). Here, the data information is defined e.g. by the impulse length $\Delta t_p$ of the transmitted impulses of vehicle signal FS and key signal SS: if the impulse length $\Delta t_p$ of vehicle signal FS and key signal SS exceeds a predefined threshold value, this is interpreted as a first logical signal level (for ex. as a logical "1"); if the impulse length $\Delta t_p$ of vehicle signal FS and key signal SS falls below a predefined threshold value, this is interpreted as a second logical signal level (for ex. as a logical "0"). If, using the cryptologic protocols, the authorization of the electronic key 2, and thus the authorization of the operator, has been verified, the operator request for the provision of access authorization to the vehicle 1 (access or startup) will be executed.

What is claimed is:

1. Procedure for the provision of access authorization to an engine-driven vehicle (1) where a bidirectional signal transmission by means of encoded transmission signals (FS, SS) between at least two transmission units (21, 22, 23), located in or on the vehicle (1), and an electronic key (2) is effected, with encoded transmission signals (FS, SS) being transmitted as vehicle signals (FS) from the transmission units (21, 22, 23) to the electronic key (2), and key signals (SS) being returned as echo signals from the electronic key (2) to the respective transmission units (21, 22, 23); wherein at least the signal run time as the time difference between a vehicle signal (FS) and the assigned key signal (SS) at different transmission units (21, 22, 23) is determined and evaluated;

using the evaluation of the time differences, the position of the electronic key (2) in relation to the vehicle (1) is determined;

and, using such identification of the electronic key (2) position, a decision on the access authorization to the vehicle (1) is made.

2. Procedure according to claim 1 wherein, for the signal run time, limit values are specified by means of which the permissible maximum limits and/or permissible ranges for the distance between the vehicle (1) and the electronic key (2) will be determined.

3. Procedure according to claim 1 wherein the evaluation of the signal run time as the time difference between the vehicle signal (FS) and the assigned key signal (SS) will be effected in the respective transmission unit (21, 22, 23) and/or in a control unit connected to the transmission units (21, 22, 23).

4. Procedure according to claim 1 wherein the bidirectional signal transmission between the transmission units (21, 22, 23) and the electronic key (2) will be initiated by an activity signaling an operator request, which activity takes place on or in the vehicle (1).

5. Procedure according to claim 1 wherein an activation signal will be transmitted as a first vehicle signal (FS) from at least one of the transmission units (21, 22, 23) to the electronic key (2).

6. Procedure according to claim 5 wherein the activation signals from the transmission units (21, 22, 23) are emitted at periodic time intervals.

7. Procedure according to claim 5 wherein the activation signals from the transmission units (21, 22, 23) will be emitted only after an activity signaling an operator request, which activity is effected on or in the vehicle (1).

8. Procedure according to claim 1 wherein data information will be encoded in the transmission signals (FS, SS).

9. Procedure according to claim 1 wherein the bidirectional signal transmission between the transmission units (21, 22, 23) and the electronic key (2) is effected by means of sound waves or electromagnetic waves.

10. Procedure according to claim 9 wherein the bidirectional signal transmission between the transmission units (21, 22, 23) and the electronic key (2) is effected by means of impulses.

11. Procedure according to claim 9 wherein the bidirectional signal transmission between the transmission units (21, 22, 23) and the electronic key (2) is effected by means of a modulated continuous signal.

12. Procedure according to claim 1 wherein the key signal (SS) will only be returned to the transmission units (21, 22, 23) on expiry of a predefined delay period following receipt of the vehicle signal (FS).

13. Procedure according to claim 1 wherein the key signal (SS) will be modified in relation to the vehicle signals (FS) received, such that during evaluation it will become possible to distinguish between the key signal (SS) as a desired echo signal and any undesirable echo signals.

* * * * *